Dec. 19, 1967   L. A. THEISSEN ET AL   3,359,039
DUAL WHEEL ATTACHMENT FOR TRACTORS
Filed July 18, 1966

INVENTORS
BERNARD E. HOGAN, JR.
LEON A. THEISSEN
BY Schroeder, Siegfried
& Ryan
ATTORNEYS

United States Patent Office 3,359,039
Patented Dec. 19, 1967

3,359,039
DUAL WHEEL ATTACHMENT FOR TRACTORS
Leon A. Theissen, St. Peter, and Bernard E. Hogan, Jr., North Mankato, Minn., assignors to Miller Motors, Inc., Mankato, Minn., a corporation of Minnesota
Filed July 18, 1966, Ser. No. 565,985
8 Claims. (Cl. 301—39)

This invention relates to dual wheel assemblies and more particularly to an improved dual wheel assembly particularly adapted for mounting dual tires on tractors or other motive equipment used for drawing farm implements or in road working machinery.

Apparatus of this general type is known and in use. The problem of providing draft equipment, such as tractors, with removable dual wheels is well recognized. The advantage of dual wheels under certain types of conditions, such as certain phases of farming and road working, for the purpose of better weight distribution of the draft equipment and to increase the output of the same is well recognized. With such dual wheels, draft equipment will not cut into the terrain being traversed to facilitate better plowing and planting and will permit a better pull characteristic of the tractor. Further the economy in the operation of the equipment together with longer tire wear, the elimination of ruts and the speed up in overall operation of the apparatus is recognized. The apparatus of this type which is presently available, however, is generally complex from the standpoint of installation and is subject to continual maintenance to prevent a buildup in dirt between wheels. Further such apparatus is generally designed for specific wheel mountings and is not universally adaptable for varying types of wheel designs.

The present invention is directed to an improved dual wheel assembly in which an auxiliary outside wheel may be readily connected to and mounted on a conventional tractor at the inboard wheels thereof to provide a dual wheel assembly which will permit proper disposition of a tractor load for increased drawing power, ease in operation, and simplified installation.

Therefore it is principal object of this invention to provide an improved dual wheel assembly.

Another object of this invention is to provide an improved dual wheel assembly which is readily attachable or detachable to and from conventional wheels on draft equipment without requirement of special wheel designs.

A still further object of this invention is to provide an improved dual wheel assembly which is rugged in construction has a high dual wheel support strength, and is simple in installation and low in cost.

These and other objects of this invention will become apparent form a reading of the attached description together with the drawings wherein.

Figure 1:
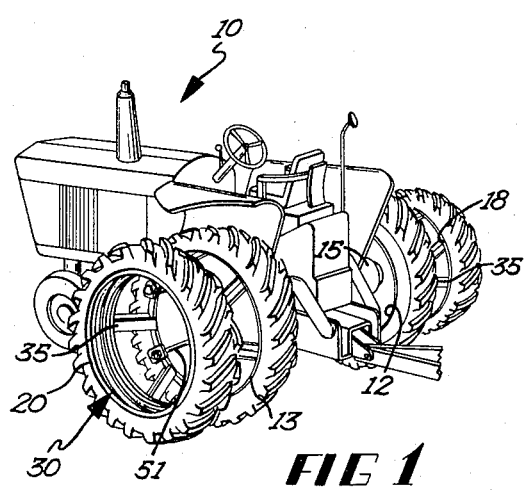
FIGURE 1 is a perspective view of a tractor showing my improved dual wheel assembly.

In FIGURE 1 a typical draft device such as a farm tractor is shown in perspective with a pair of dual wheels at the back or drive end of the same. Such a tractor is normally equipped with the single drive wheels on the rear axle which will be used for general purpose farm work in such a manner. This is also true in special types of earth working equipment such as road making machinery. Thus the conventional tractor, shown schematically at 10, will have conventional inner drive wheels 12 and 13 connected to the drive axle or rear axle 15 of the tractor in a conventional manner. Whenever it is desired to use such draft apparatus for heavy-duty load hauling or under certain conditions of cultivation and planting, it is desirable to have additional wheels and tires coupled to the main drive wheels which will distribute the load on the individual tires and give a greater contact area with the surface upon which the tractor or draft device is moving. This will, under conditions of soft ground or terrain or uneven ground or terrain, cause the tractor to cut less furrows or grooves in the ground and enable the tractor to more smoothly traverse the terrain. In addition, a greater gripping or torque surface is provided which will enable faster operation of the vehicle and will provide greater load pulling ability. Thus with respect to a farming operation where a combined cultivating planting situation is present, the elimination of packed ground, ridges in the ground and greater load pulling ability will insure for faster, effective and more accurate planting. Under such conditions it is desirable to fit the conventional tractor or draft device with the additional dual wheels which are used under such special conditions and then readily removed.

Figure 2:
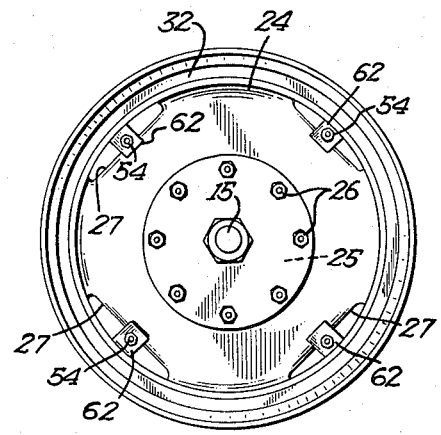
FIGURE 2 is a side elevation view of a portion of the tractor showing the dual wheels.
Figure 3:
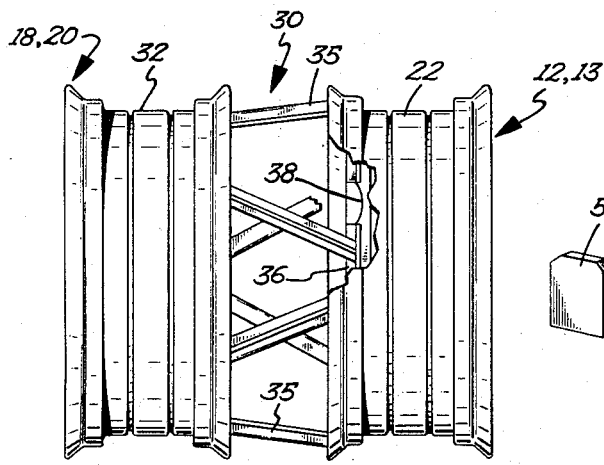
FIGURE 3 is an end elevation view of the portion of the tractor showing the dual wheels on one side thereof.
Figure 4:
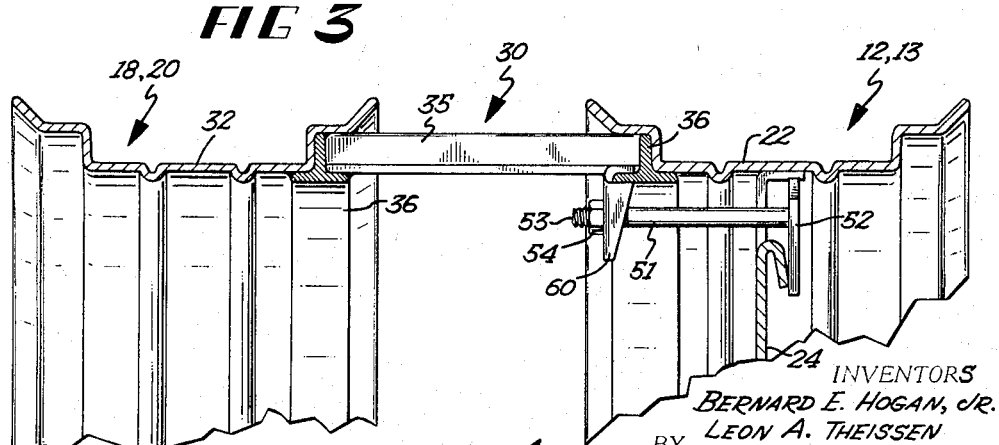
FIGURE 4 is a sectional view of a dual wheel assembly taken along the lines 4—4 in FIGURE 1.

Thus the present invention is directed to the combination of an improved dual wheel assembly which includes an outboard wheel attachment and supporting structure together with a conventional inboard dual wheel. In FIGURE 1, the outboard wheels with tires thereon are indicated at 18 and 20 respectively, which outboard wheels are connected, as will be hereinafter described, to the inboard wheels 12 and 13 to be driven thereby and aid in the distribution of the weight and improve the draft characteristics of the tractor for the reasons and purposes noted above. As will be seen in FIGURES 2, 3 and 4, the inboard or conventional wheel assembly with which the tractor or draft device is normally equipped includes basically a rim 22 upon which the tires 12 or 13 are mounted with the rim 22 being connected to or formed integral with an inner generally circular supporting plate 24. This plate includes apertures or an aperture at the center by means of which the plate is attached to the hub of the drive axle, indicated generally at 25, through suitable nut and bolt means indicated generally at 26. Such a structure normally includes apertures 27 formed about the periphery of the supporting plate 24 in the areas where the supporting plate is not connected directly to the rim. Thus the supporting plate is generally not a complete solid disc but rather includes openings or apertures for construction purposes which will facilitate welding or attachment of the plate to the rim in a conventional manner.

In the present invention the outboard wheels 18 and 20 are connected to the inboard wheels through a supporting truss like structure or web, indicated generally at 30, which carry the outboard rim 32 upon which the outboard tire is mounted. The rim 32 is identical in size and shape with the rim portion 22 of the inboard wheel and the tire size of the tire mounted thereon is the same as that of the inboard wheel for uniform and best load distribution and draft purposes. The truss or supporting web is physically attached, such as by welding, to the outboard rim 32 and is comprised of a plurality of spokes or bar members 35 which extend from one surface of the outboard rim and at an angle to the face thereof and are connected at their opposite extremity to an annular connecting band 36 by suitable means, such as welding. The supporting bars or spokes of the web are connected in a truss like manner forming an angle with the annular connecting band 36 and the face of the outboard rim 32 as will be seen in the drawings. They are disposed in the same manner with respect to the geometric center of the rim and the annular band and lie in a circumferential plane to provide a generally open spacing between the tires except for the connecting bars which will prevent a buildup of dirt between the tires or packing of dirt in this area so as to reduce general maintenance and cleaning problems in connection with dual wheels. Further the angle at which the supporting spokes or bars connect to the connecting band 36 and the rim 32 is such as to increase the torsional strength of the connection between the connecting band 36 and the rim 32. In addition, the spokes or bars are generally T shaped in cross-section such that one edge or rib of the same will extend radially in the general direction of the geometric center of the combined supporting web and rim to increase the shear strength of this truss section. In addition, the annular band is T shaped in cross-section with the flat or broad surface of this cross-section being disposed on the inner edge or inner side of the band and with the projecting rib extending outwardly. In addition the annular band has a curved or recessed portion 38 therein which, as will be later noted, serves as an access opening to the valve stem of the inner tractor tire.

Figure 5:
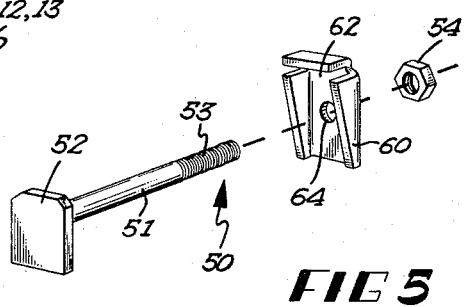
FIGURE 5 is a prespective view of one of the connecting parts of the dual wheel assembly.

The outboard dual unit, namely the rim 32 and the supporting web 35 are connected to the inboard wheel through suitable connecting members, indicated generally at 50. These connecting members include a bolt like portion or member 51 having a flanged extremity 52, a threaded portion 53 at the opposite extremity and a suitable conventional nut 54 adapted to thread thereon. In addition, the connecting parts include a flanged member 60 which is generally L shaped in form having a U shaped notch 62 on one side thereof and a transverse portion with an aperture 64 therein, such as will be seen in FIGURES 5 and 6. The flange or flanged extremity 52 of the connecting bolt like member 51 is adapted to fit through the peripheral apertures 27 or slots at the edge of the supporting plate 24 of the inboard wheel. The flange portion extends transversely to the general extent of the bolt member 51 and the head is sufficient to provide a flange surface which will bear against the back side of the supporting plate in the connecting or clamping operation. The flange members 60 at its notch 62 will fit over the inner surface of the annular band 36 at its outward edge, that is closest to the outboard rim and the flat or transverse surface at the L shaped connecting flange 62 will bear against the inner surface of the band. This will position the portion of the flange member 60 with the aperture 64 therein inwardly of the band and will positively connect the flange member 60 on the annular band so that it will not dislodge therefrom. The application of the flange members 60 to the T shaped annular band 36 provides the versatility in our dual wheel attachment which makes it applicable for installation for most types of tractor and vehicle wheels. The flange members at their notch 62 will slide on the rim of the annular band so that they can be moved around the band to allow connection of the dual attachment at any place or places on the inner wheel. Thus the flange members will be positioned in substantial alignment with suitable apertures in the inner wheel supporting plate to facilitate positive connection of this attachment thereto.

The connecting members 50 generally connect the band 36 to the supporting plate 24 of the inner wheel to provide for concentric and axial alignment of the outer and inner rims. The connecting parts 50 including the bolt member 51 is positioned through the aperture 27 in the support plate with the opposite extremity extending through the aperture 64 in the flange 60 mounted on the outboard edge of the rim or annular band 36. The nut 54 will be positioned outboard of the flange and will tend to clamp or draw the annular band against the face of the inboard rim 22 about the periphery of the band 36 and inboard rim to provide for any desired spacing and a positive connection between the outboard and inboard wheels. Several such connecting members, that is bolt members and flanges, are distributed about the supporting plate of the inboard wheel in accord with the number of apertures available therein and suitably placed flange members 60 on the annular band will serve to cooperate with the bolt portion and nuts to clamp the annular band against the inboard rim for this purpose. This may be readily accomplished wthout disassembly of the inner wheel and will accurately locate the outer wheel with respect thereto. It will also provide that no special wheel construction is required for such clamping purpose and there is no need to remove the inner wheel when the dual assembly is added to the conventional inboard wheels of a draft device. Normally 4 to 6 such connecting members are distributed about the wheels for positive connection of the outboard wheel to the input wheel. The tire may be mounted on the outboard rim during this operation and with the dual so added, the outboard and inboard wheels will be spaced apart the distance between the outboard and inboard rims as defined by the width of the supporting web or truss structure 35. This is generally open so that any dirt coming between the tires mounted on the rims will be forced between the same and through the support or web structure to be readily dislodged during normal driving operation. This will eliminate the problem of cleaning between wheels. Such a structure will provide ready access to the inboard tire for maintenance purposes and will permit the outboard dual assembly to be attached or detached from the inboard wheel without special tools. Further this improved structure is strong so as to resist torsional fracture or shear fracture and will provide all of the intended advantages of dual wheel assemblies with draft devices. The simplicity of installation and the reduced maintenance thereof together with the adaptability of such wheel assemblies with conventional tractor wheels provides for uniform application of the same.

In considering this invention it should be remembered that the present disclosure is intended to be illustrative only and the scope of the invention should be determined by the appended claims.

What is claimed is:

1. A dual wheel assembly comprising, an inboard wheel including a rim upon which a tire is adapted to be mounted and a connecting plate structure mounting the rim and adapted to mount the wheel to an axle of a vehicle for supporting the vehicle, said connecting plate having means at the central portion thereof to connect to the vehicle axle and spaced apertures therein near the peripheral edge of the same adjacent the rim, an outboard wheel including a rim which is adapted to have a second tire for supporting the vehicle mounted thereon, said outboard wheel having a supporting circumferential web structure integral therewith and extending to one side of the rim, said web structure having an annular band remote from the rim of the outboard wheel, a plurality of bolt members having a connecting portion at one extremity adapted to fit into the spaced apertures in the connecting plate structure of the inboard wheel, removable flange members for said bolt members having a passage therein through which the other extremity of the bolt members extend with said removable flange members having a connecting portion thereon adapted to fit around a surface of the annular band of the supporting web structure, and nut means threaded over said other extremity of said bolt members and against the flange members to draw the outboard wheel against the rim of the inboard wheel at the supporting web structure with the connecting portion of the bolt members being retained through the apertures in the connecting plate structure on the inner wheel to hold the dual wheel assembly in assembled relationship.

2. The dual wheel asembly of claim 1 in which the connecting portion of the bolt members are transversely extending flanges at said one of said extremity of the same and the passage through the connecting flanges are apertures therein.

3. The dual wheel assembly of claim 2 in which the annular band is T shaped in cross-section.

4. The dual wheel assembly of claim 3 in which each of the flange members has a connecting portion which is a U shaped notch designed to fit over one edge of the T shaped annular band and bear against the same to support the flange members on the annular band of the supporting web structure.

5. The dual wheel assembly of claim 4 in which the supporting web structure includes a plurality of bar members angularly spaced about the periphery of the rim of the outboard wheel and extending to and connecting to the annular rim at the same angle with the annular rim being spaced from and parallel to an edge of the rim of the outboard wheel.

6. The dual wheel assembly of claim 5 in which the annular rim has an edge remote from the edge upon which the connecting portion of the flange members are mounted which bears against the rim of the inner wheel in assembled relationship.

7. The dual wheel assembly of claim 2 in which the supporting web structure includes a plurality of transversely extending support members integrally connected to the rim of the outboard wheel and to the annular band to provide a supporting structure which is substantially open and in which the support members are connected at an angle to the rim and the annular band and formed integral therewith to provide a truss like structure.

8. The dual wheel assembly of claim 5 in which the angles that the bar members bear with the rim of the outboard wheel and the annular band is other than 90°.

References Cited

UNITED STATES PATENTS

| | | | |
|---|---|---|---|
| 932,969 | 8/1909 | Dennison | 301—39 |
| 1,580,385 | 4/1926 | Schroeder. | |
| 3,082,040 | 3/1963 | Degerness | 301—36 |
| 3,237,992 | 3/1966 | Kiesau | 301—36 |

RICHARD J. JOHNSON, *Primary Examiner.*